(12) United States Patent
McGee et al.

(10) Patent No.: US 6,877,077 B2
(45) Date of Patent: Apr. 5, 2005

(54) MEMORY CONTROLLER AND METHOD USING READ AND WRITE QUEUES AND AN ORDERING QUEUE FOR DISPATCHING READ AND WRITE MEMORY REQUESTS OUT OF ORDER TO REDUCE MEMORY LATENCY

(75) Inventors: Brian J. McGee, San Jose, CA (US); Jade B. Chau, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 357 days.

(21) Appl. No.: 10/020,565

(22) Filed: Dec. 7, 2001

(65) Prior Publication Data

US 2003/0110350 A1 Jun. 12, 2003

(51) Int. Cl.[7] .............................................. G06F 12/00
(52) U.S. Cl. ....................... 711/158; 711/151; 711/169; 710/39; 710/54
(58) Field of Search ..................... 710/39, 54; 711/151, 711/158, 169

(56) References Cited

U.S. PATENT DOCUMENTS

| | | | | |
|---|---|---|---|---|
| 5,630,096 A | * | 5/1997 | Zuravleff et al. | 711/154 |
| 5,948,081 A | * | 9/1999 | Foster | 710/40 |
| 6,092,158 A | * | 7/2000 | Harriman et al. | 711/151 |
| 6,253,262 B1 | * | 6/2001 | Rozario et al. | 710/39 |
| 6,256,713 B1 | * | 7/2001 | Audityan et al. | 711/141 |
| 6,272,600 B1 | * | 8/2001 | Talbot et al. | 711/140 |
| 6,487,640 B1 | * | 11/2002 | Lipasti | 711/140 |
| 6,496,917 B1 | * | 12/2002 | Cherabuddi et al. | 711/204 |
| 6,526,484 B1 | * | 2/2003 | Stacovsky et al. | 711/158 |
| 6,564,304 B1 | * | 5/2003 | Van Hook et al. | 711/154 |

* cited by examiner

Primary Examiner—Christian P. Chace
(74) Attorney, Agent, or Firm—Martine Penilla & Gencarella, LLP (57) ABSTRACT

In one of the many embodiments disclosed herein, a method for dispatching read and write requests to a memory is disclosed which includes queuing at least one write request in a write queue and queuing an incoming read request in a read queue. The method also includes comparing the read request with at least one write request in the write queue to detect a matching write request, and if there is a matching write request, storing a write queue index of the matching write request as a first entry in an ordering queue. The method further includes dispatching the at least one write request to the memory in response to the first ordering queue entry.

25 Claims, 5 Drawing Sheets

MEMORY CONTROLLER AND METHOD USING READ AND WRITE QUEUES AND AN ORDERING QUEUE FOR DISPATCHING READ AND WRITE MEMORY REQUESTS OUT OF ORDER TO REDUCE MEMORY LATENCY

BACKGROUND

1. Field of Invention

This invention relates generally to microprocessors and specifically to maintaining data coherency in microprocessors.

2. Description of Related Art

Modern computer systems utilize a hierarchy of memory elements in order to realize an optimum balance between the speed, size, and cost of computer memory. These computer systems typically employ a primary memory such as dynamic random access memory (DRAM) and a larger, but much slower, secondary memory such as a magnetic storage device or hard disk. A small, fast cache memory such as static random access memory (SRAM) is typically provided between the central processing unit (CPU) and primary memory. This fast cache memory increases the data bandwidth of the computer system by storing information most recently needed by the CPU. In this manner, information most recently requested during execution of a computer program may be rapidly provided to the CPU from the cache memory, thereby eliminating the need to access the much slower primary and secondary memories. Although fast, the cache memory is very expensive and is therefore typically small to minimize costs.

Figure 1:
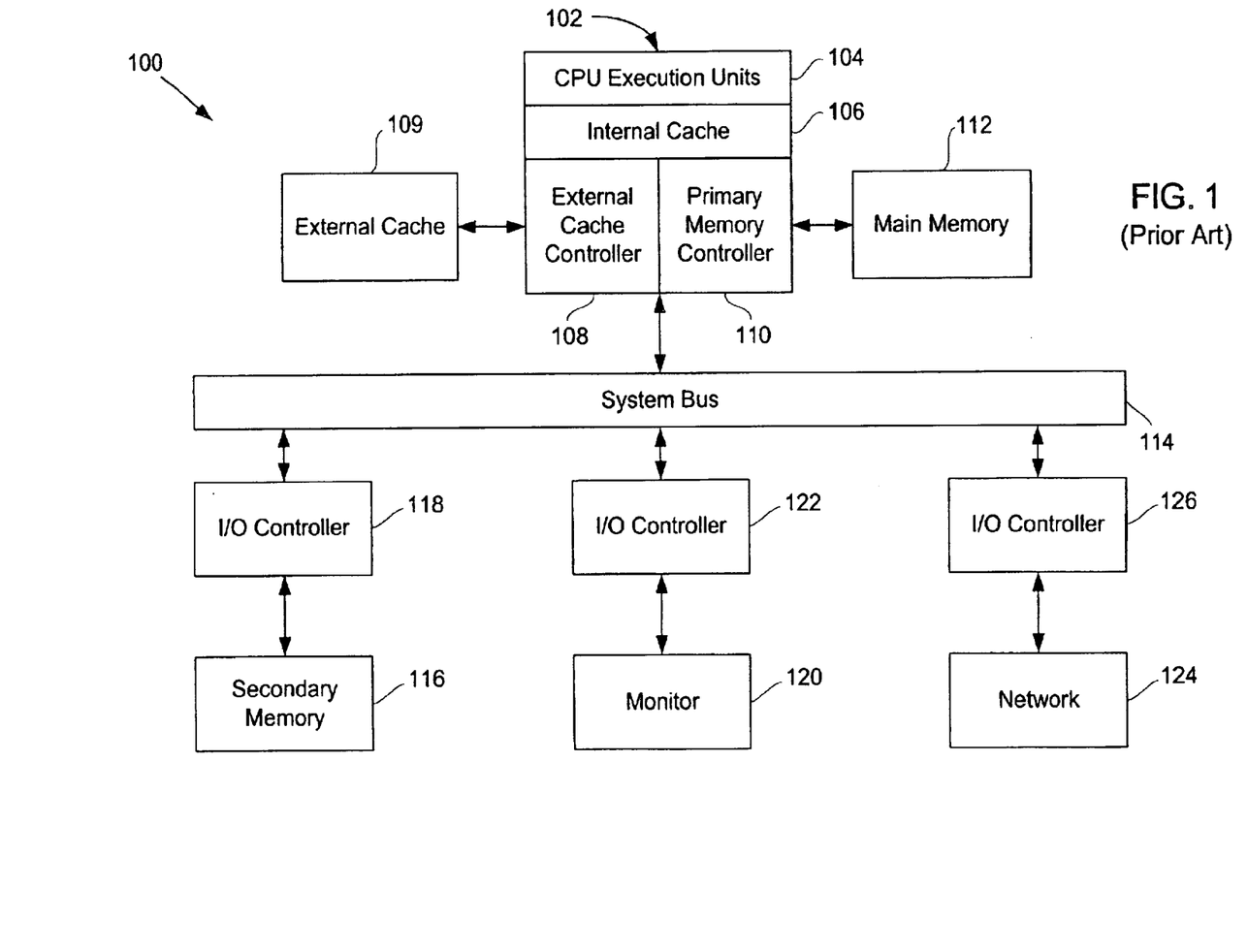
FIG. 1 is a block diagram of a conventional computer system including a central processing unit (CPU)

FIG. 1 illustrates a well-known general computer system 100 having a central processing unit (CPU) 102 including CPU execution units 104, an internal (e.g., level 1 (L1)) cache memory 106, an external cache controller 108, and a primary memory controller 110. Typically, internal cache 106 is divided into an instruction cache, in which the most recently requested instructions are stored, and a data cache, in which the most recently requested data is stored. External cache controller 108 is coupled to and controls an external (e.g., level 2 (L2)) cache memory 109, and memory controller 110 is coupled to and controls primary memory 112. Although not shown for simplicity, memory controller 110 may include a write queue to store pending write requests for primary memory 112 and a read queue to store pending read requests for primary memory 112. CPU 102 is also coupled to a system bus 114, which in turn is coupled to a secondary memory 116 via an input/output (I/O) controller 118, to a monitor 120 via I/O controller 122, and to a network connection 124 via I/O controller 126.

During execution of a computer program, the computer program instructs CPU 102 to fetch instructions by incrementing a program counter within CPU 102. In response thereto, CPU 102 fetches the instructions identified by the program counter. If the identified instruction requests data, an address request specifying the location of that data is issued. CPU 102 first searches internal cache 106 for the specified data. If the specified data is found in internal cache 106 (a cache hit), that data is immediately provided to CPU execution units 104 for processing. If, on the other hand, the specified data is not found in internal cache 106, external cache 109 is then searched.

If the specified data is not found in external cache 109, the address request is provided to memory controller 110, which in turn queues the address request in its memory read queue. The memory read queue provides the read request to primary memory 112, which in turn searches for the requested data. In response thereto, primary memory 112 returns the requested data to CPU execution units 104 for processing. Primary memory 112 also returns the corresponding line of data to internal cache 106 so that subsequent address requests identifying other information in the data line will result in an internal cache hit, thereby allowing the data to be returned from internal cache 106 rather than from the much slower primary memory. In this manner, latencies associated with accessing primary memory may be hidden, thereby increasing the data bandwidth of CPU 102.

Data stored in lines of internal cache 106 may be modified by CPU execution units 104 in response to the instructions of the computer program and, therefore, may not always be consistent with the original copy stored in primary memory 112. Typically, modified data stored in a line of internal cache 106 is not written back to primary memory 112 until the cache line is needed for storing new data retrieved from primary memory. During a well-known cache replacement operation, a line of internal cache 106 is selected to store the new data. If the cache line to be replaced has not been modified, and thus is consistent with the original copy in primary memory 112, the cache line is deleted. On the other hand, if the cache line has been modified, and is thus no longer consistent with the original copy in primary memory 112, the cache line is written back to primary memory 112 during a well-known writeback operation. During writeback, a write request identifying the modified cache data is provided to primary memory controller 110, which in turn stores the address request in its write queue. The write queue then forwards the write request to primary memory 112, which in turn updates the identified address with the modified data. In this manner, data coherency is maintained.

The read and write queues, which may be a single queue, typically forward their respective read and write requests to primary memory 112 in the same order in which they were issued by CPU 102 in order to maintain proper ordering, which in turn ensures data coherency. Thus, in dispatching requests to primary memory 112, write requests are intertwined with read requests, as determined by the execution order of their corresponding instructions. Because maintaining a constant execution flow in the CPU pipeline is dependent upon the prompt return of fetched instructions and the data requested by the fetched instructions, i.e., upon the prompt servicing of read requests, servicing write requests to primary memory may undesirably stall the execution of instructions in the pipeline by delaying the dispatch of read requests to primary memory.

Further, because each instance in which a write request is dispatched to primary memory 112 after a read request requires primary memory 112 to switch from a read operation to a write operation, and vice versa, the intertwining of read and write requests dispatched to primary memory 112 may result in a significant number of switches between primary memory read and write operations. The delays associated with switching between primary memory read and write operations may reduce the performance of CPU 102.

Accordingly, it would be desirable to dispatch read and write requests to primary memory in a manner that minimizes pipeline execution stalls and minimizes the frequency with which primary memory switches between read and write operations.

SUMMARY

A method and apparatus are disclosed that allows read requests for primary memory to bypass write requests for primary memory to increase pipeline efficiency while preserving data coherency. In accordance with the present invention, a memory control unit for controlling a primary memory includes a read queue, a write queue, and an ordering circuit. The read queue stores read requests for the primary memory, and includes head, tail, and dispatch pointers, where the head pointer indicates the row containing the highest priority or oldest valid read request, the tail pointer indicates the next available row of the read queue, and the dispatch pointer indicates a dispatch point for the read queue. The write queue stores write requests for the primary memory, and includes a head pointer to indicate the oldest write request and a tail pointer to indicate the next available row in the write queue. The ordering circuit is coupled to both the read queue and the write queue, and causes the read requests to be dispatched to primary memory before any of the write requests are dispatched to primary memory, regardless of the order in which they were issued, unless a read after write (RAW) condition is detected. A RAW condition occurs when a read request addresses the same data as an older write request, in which case the write request is dispatched to primary memory before the read request so that the read request will retrieve data updated by the write request. Otherwise, the read request may retrieve invalid data (e.g., stale data).

Specifically, each read request to be queued in the read queue is compared with write requests already queued in the write queue to detect a RAW condition. If there is not a match, the ordering circuit causes the read requests to be dispatched to primary memory before the write requests, even if the write requests are older than the read requests. By allowing read requests to bypass write requests, data requested by the instructions of a computer program may be more quickly returned from primary memory for execution, thereby minimizing pipeline execution stalls. In addition, allowing read requests to bypass write requests may result in more consecutive read requests being dispatched to primary memory, thereby advantageously reducing the frequency with which primary memory switches between read and write operations.

If there is a match, i.e., if there is a RAW condition, the tail pointer of the write queue (e.g., which indicates the write queue index containing the matching write request) is stored as an entry in the ordering circuit. In response thereto, the ordering circuit causes the write queue to dispatch its write requests to primary memory until the write queue head pointer equals the write queue tail entry stored in the ordering circuit, at which point the write queue tail entry in the ordering circuit is invalidated. In this manner, the older matching write request is dispatched to primary memory before the read request, thereby ensuring that the read request retrieves the updated data. In some embodiments, all write requests queued in the write queue may be dispatched to primary memory upon detection of the RAW condition.

Present embodiments may also allow write requests to bypass older read requests. In one embodiment, each write request to be queued in the write queue is compared with read requests already queued in the read queue to detect a match, which indicates a write after read condition (WAR). If there is not a match, the write requests may be dispatched to primary memory before the read requests queued in the read queue, even if the read requests are older than the write request, without jeopardizing data coherency. It may be desirable to dispatch the write requests before older read requests, for example, to prevent the write queue from becoming full, which in turn may cause pipeline execution stalls.

If there is a match, which indicates a WAR condition, the read queue tail pointer (e.g., which indicates the read queue index containing the matching read request) is stored as an entry in the ordering circuit. In response thereto, the ordering circuit causes the read queue to dispatch its read requests to primary memory until the read queue dispatch pointer equals the read queue tail entry stored in the ordering circuit, at which point the read queue index entry in the ordering circuit is invalidated. In this manner, the older matching read request is dispatched to primary memory before the write request, thereby ensuring that the read request receives the data before it is updated.

BRIEF DESCRIPTION OF THE DRAWINGS

The features and advantages of the present invention are illustrated by way of example and are by no means intended to limit the scope of the present invention to the particular embodiments shown, and in which.

Like reference numerals refer to corresponding parts throughout the drawing figures.

DETAILED DESCRIPTION

Present embodiments are discussed below in the context of a computer system 200 for simplicity only. It is to be understood that present embodiments are equally applicable to other computer systems of various architectures and configurations. For example, although described below in the context of single processor system, the present invention may be readily practiced in multi-processor computer systems. Further, the particular logic levels assigned to signals and control bits discussed herein are arbitrary, and thus may be reversed where desirable. In addition, single signal lines may alternatively be multiple signal lines or buses, and multiple signal lines or buses may be single signal lines. Also, bi-directional buses may be replaced by unidirectional buses. Accordingly, the present invention is not to be construed as limited to specific examples described herein but rather includes within its scope all embodiments defined by the appended claims.

Figure 2:
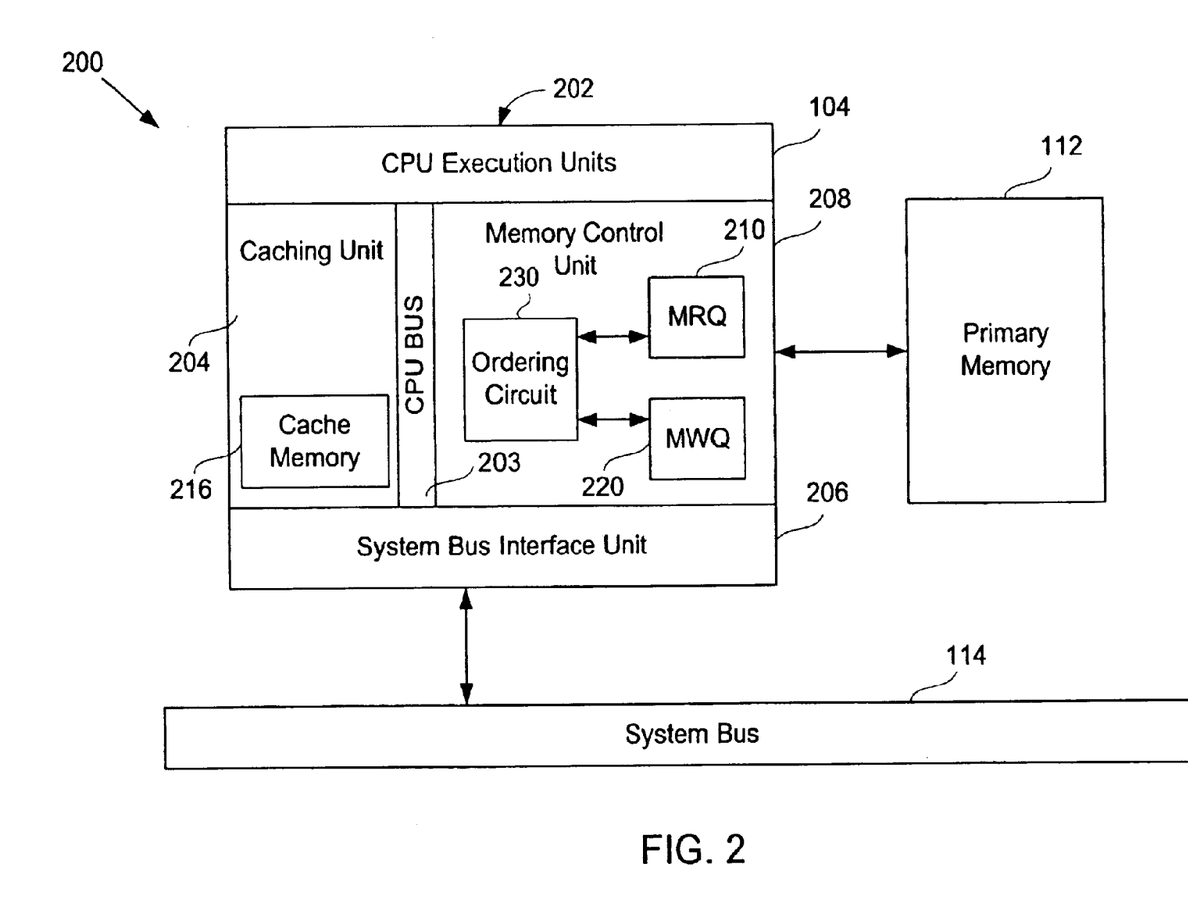
FIG. 2 is a block diagram of a CPU in accordance with one embodiment of the present invention.

Referring to FIG. 2, a computer system 200 constructed in accordance with one embodiment of the present invention includes a central processing unit (CPU) 202, primary memory 112, and system bus 114. Primary memory 112 may be any well-known memory such as, for example, DRAM. System bus 114 is coupled to processor 202 or CPU and may incorporate any well-known bus architecture. Although not shown in FIG. 2 for simplicity, computer system 200 may also include other conventional components consistent with those shown in FIG. 1 such as, for example, secondary memory 116, monitor 120, and network connection 124, which all may be coupled to system bus 114. Further, in other embodiments, additional processors 202 (not shown for simplicity) may also be coupled to system bus 114.

Processor 202 includes CPU execution units 104, a CPU bus 203, a caching unit 204, a system bus interface unit (BIU) 206, and a memory control unit (MCU) 208. CPU execution units 104 include well-known components such as, for instance, arithmetic logic units (ALUs), shift circuits, a program counter, and other execution units, which all may be used in the processing of instructions and data of a computer program. CPU bus 203 facilitates communication between CPU execution units 104, caching unit 204, BIU 206, and MCU 208 in a well-known manner. BIU 206 provides communication between processor 202 and system bus 114 in a well-known manner.

Caching unit 204 may be conventional, and includes a cache memory 216 and well-known control logic (not shown) for controlling operation of cache memory 216. Cache memory 216 may be a multi-level cache memory, for example, having a level 1 (L1) cache, a level 2 (L2) cache, and a level 3 (L3) cache. The L1 cache may be divided into an instruction cache and a data cache, and may include additional caches, for example, such as a pre-fetch cache for storing speculative instruction and/or data fetches. In some embodiments, the L2 and L3 caches may be external to processor 202.

MCU 208 is coupled to and controls access to primary memory 112, and is shown to include a memory read queue (MRQ) 210, a memory write queue (MWQ) 220, and an ordering circuit 230. MCU 208 also includes additional circuitry (not shown for simplicity) for controlling primary memory 112. MRQ 210 is a well-known content addressable memory (CAM) that stores read requests until they are dispatched to primary memory 112, and may include an associated random access memory (RAM) to store status and control information for each of the read requests. MWQ 220 is a well-known CAM that stores write requests until they are dispatched to primary memory 112, and may include an associated RAM to store status and control information for each of the write requests. In one embodiment, MRQ 210 includes 16 rows to store up to 16 read requests for primary memory 112, and MWQ 220 includes 5 rows to store up to 5 write requests for primary memory 112. In one embodiment, MRQ 210 and MWQ 220 include 28-bit CAM fields to store 28-bit addresses, and include a 2-bit RAM field to store two additional address bits.

Ordering circuit 230 monitors MRQ 210 and MWQ 220, and in response thereto may re-assign priority between the read and write requests queued therein to allow read and write requests to be dispatched to primary memory 112 in an out-of-order manner with respect to each other without jeopardizing data coherency. As mentioned above, maintaining a smooth flow in the CPU execution pipeline requires the prompt and continuous return of requested data from primary memory. By allowing read requests to bypass older write requests, ordering circuit 230 allows data requested from primary memory to be more promptly returned to the CPU for execution, thereby minimizing pipeline execution stalls caused by delays in dispatching read requests to primary memory. In addition, the ability to dispatch numerous read requests to primary memory without dispatching any intervening write requests to primary memory advantageously allows for a reduction in the frequency with which primary memory switches between read and write operations. As a result, the number of delays associated with switching between primary memory read and write operations is reduced, which in turn may increase the memory bandwidth of processor 202.

Specifically, as each read request is queued in MRQ 210, its address request is compared to the write request addresses queued in MWQ 220 to detect a RAW condition. If there is not a match, the read request may be dispatched to primary memory 112 before the write requests queued in MWQ 220 are dispatched to primary memory, even if the write requests are older than the read request. Conversely, if there is a match, which indicates a RAW condition, the matching write request is dispatched to primary memory 112 before the read request in order to maintain data coherency. In some embodiments, when a RAW condition is detected, all older write requests are dispatched to primary memory 112. In this manner, multiple write requests may be dispatched from MCU 208 to primary memory 112 without switching between memory read and write operations, thereby reducing the frequency with which primary memory 112 switches between read and write operations.

Present embodiments also allow write requests to bypass older read requests, for example, in order to dispatch write requests to primary memory before the write queue becomes full. To allow write requests to bypass read requests without jeopardizing data coherency, each write request to be queued in MWQ 220 is compared to the read requests already queued in MRQ 210. If there is a match, which indicates a write after read (WAR) condition, the matching read request is dispatched to primary memory 112 before the write request so that the read request retrieves data before it is modified by the more recent write request. Conversely, if there is not a match, the write request(s) may be dispatched to primary memory before the read requests, even if the read requests are older than the write request(s).

Figure 3:
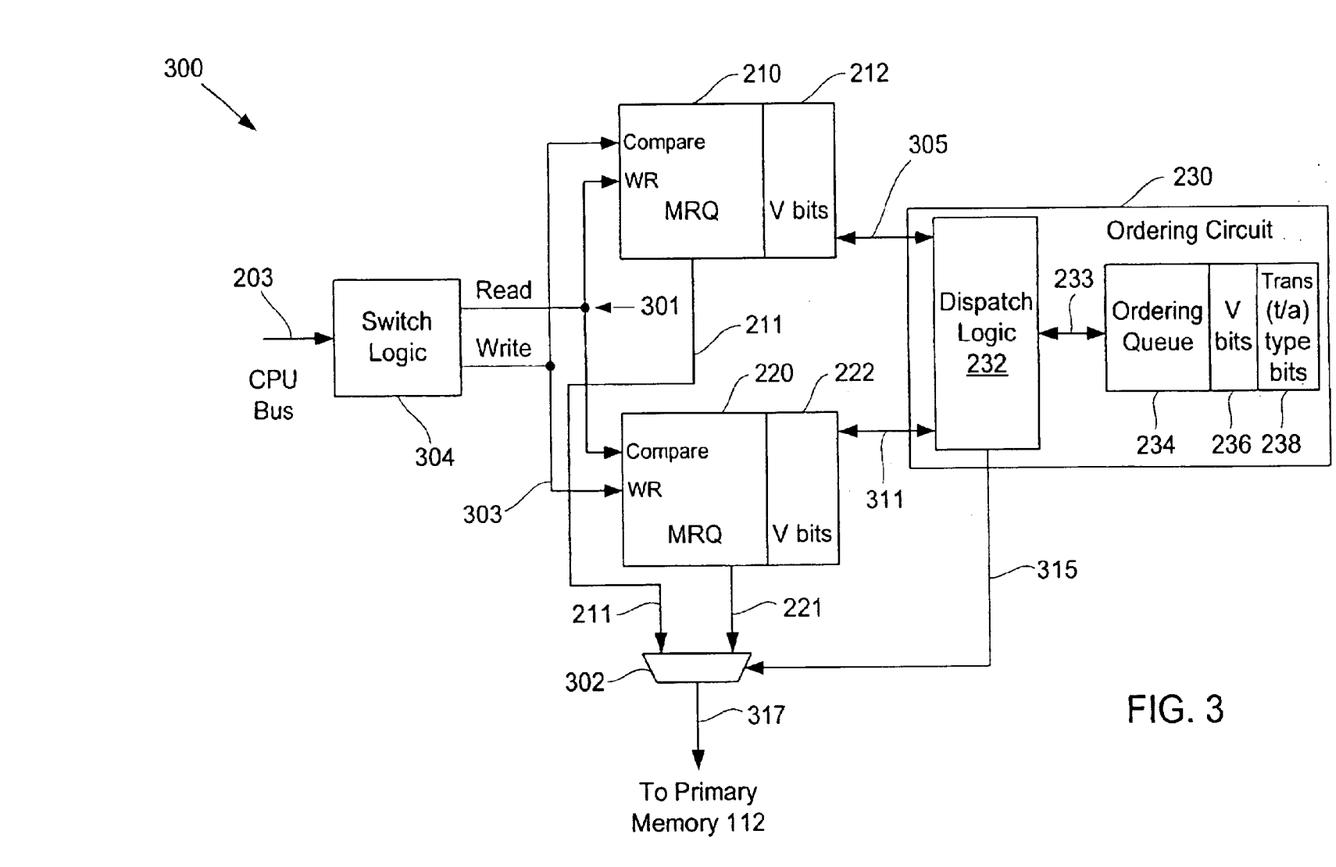
FIG. 3 is a block diagram of one embodiment of the memory control unit of the CPU of FIG. 2.

FIG. 3 is a block diagram of an MCU 300, that is one embodiment of MCU 208 of FIG. 2. MCU 300 is shown to include MRQ 210, MWQ 220, ordering circuit 230, a MUX 302, and switch logic 304. As mentioned above, MRQ 210 and MWQ 220 are well-known CAM devices, and therefore a detailed explanation of their components and operation is not included herein for simplicity. Thus, although not shown in FIG. 3, MRQ 210 and MWQ 220 each include comparand registers, address decoders, match flag circuits, priority encoders, and other well-known components. Further, although not shown in FIG. 3, MCU 300 may also include one or more data buffers to store data associated with requests queued in MRQ 210 and MWQ 220.

Read and write requests issued on CPU bus 203 from, for example, caching unit 204 (see also FIG. 2), are provided to an input of switch logic 304, which also includes a first output coupled to bus 301 and a second output coupled to bus 303. Each request provided to switching logic 304 includes a control bit indicating whether the request is a read request or a write request. In response to the control bit, switching logic 304 routes read requests onto bus 301 and routes write requests onto bus 303.

MRQ 210 has a write input coupled to bus 301, a compare input coupled to bus 303, and a read request output coupled to bus 211. MRQ 210 provides match, validity, and pointer information to ordering circuit 230 via bi-directional bus 305, and receives address and control information from ordering circuit 230 via bus 305. In response to the address and control signals from ordering circuit 230, MRQ 210 dispatches one or more read requests onto bus 211. MRQ 210 also includes an extra column of valid bit cells 212 to indicate whether valid read requests are queued in corresponding rows of MRQ 210. In one embodiment, MRQ 0.210 may include an extra column of dispatch bits (not shown for simplicity) to indicate whether corresponding read requests have been dispatched to primary memory 112. Further, although not illustrated in FIG. 3, MRQ 210 includes well-known head, tail, and dispatch pointers, where the head pointer indicates the row containing the highest priority or oldest valid read request, the tail pointer indicates the next available row of MRQ 210, and the dispatch pointer indicates a dispatch point for MRQ 210. In other embodiments, the dispatch pointer may be eliminated, and the head pointer may be used to indicate the highest-priority or oldest read request that has not been dispatched to primary memory.

MWQ 220 has a write input coupled to bus 303, a compare input coupled to bus 301, and a write request output coupled to bus 221. MWQ 220 provides match, validity, and pointer information to ordering circuit 230 via bi-directional bus 311, and receives address and control information from ordering circuit 230 via bus 311. In response to the address and control signals from ordering circuit 230, MWQ 220 dispatches one or more write requests onto bus 221. MWQ 220 also includes an extra column of valid bit cells 222 to indicate whether valid write requests are queued in corresponding rows of MWQ 220. In one embodiment, MWQ 220 includes an extra column of dispatch bits (not shown for simplicity) to indicate whether corresponding write requests have been dispatched to primary memory 112. Further, although not illustrated in FIG. 3, MWQ 220 includes well-known head and tail pointers.

MUX 302 includes inputs to receive read requests from MRQ 210 via bus 211 and to receive write requests from MWQ 220 via bus 221. In response to a control signal provided by ordering circuit 230 via line 315, MUX 302 selectively dispatches either read requests from bus 211 or write requests from bus 221 to primary memory 112 via bus 317.

Ordering circuit 230 is shown to include dispatch logic 232 coupled to an ordering queue (OQ) 234 via bi-directional bus 233. Ordering queue 234 includes a plurality of rows, each for storing the read queue index of a read request that addresses the same data as an older write request, or alternately the write queue index of a write request that addresses the same data as an older read request. Ordering queue 234 also includes an extra column of cells 236 to store valid bits indicating whether corresponding rows of ordering queue 234 contain valid index entries. Further, ordering queue 234 includes an extra column of cells 238 to store transaction (t/a) type bits, each of which indicates whether a corresponding index entry refers to a read request stored in MRQ 210 or to a write request stored in MWQ 220. In addition, ordering queue 234 includes well-known head and tail pointers, where the OQ head pointer indicates the ordering queue entry to be processed, and the OQ tail pointer indicates the next available row in ordering queue 234. In some embodiments, ordering queue 234 is a CAM device, while in other embodiments, ordering queue 234 is implemented using conventional registers and comparators. In one embodiment, ordering queue 234 includes 8 rows to store up to 8 request indices.

During operation, if a read request to be queued in MRQ 210 matches a write request already queued in MWQ 220, the MWQ tail pointer is stored as an index entry in a row of ordering queue 234 indicated by the OQ tail pointer. The MWQ tail pointer indicates the MWQ index containing the write request corresponding to the RAW condition (e.g., the matching write request). Similarly, if a write request to be queued in MWQ 220 matches a read request already queued in MRQ 210, the MRQ tail pointer is stored as an index entry in the row in ordering queue 234 indicated by the OQ tail pointer.

Dispatch logic 232 monitors ordering queue 234 for valid entries, each of which corresponds to either a RAW condition or a WAR condition, and thus signals a potential data coherency issue. In normal operation, e.g., when there are not any valid index entries in ordering queue 234, dispatch logic 232 causes MRQ 210 to dispatch its read requests to primary memory 112 ahead of write requests queued in MWQ 220, irrespective of ordering, i.e., regardless of whether the write requests are older than the read requests. Thus, while there are no valid MWQ index entries stored in ordering queue 234, dispatch logic 232 allows read requests to bypass write requests in order to more quickly return data from primary memory 112 to CPU 202 for execution.

Upon detection of a valid entry in ordering queue 234, dispatch logic 232 assumes control of dispatching read and write requests to primary memory 112, and causes MRQ 210 and/or MWQ 220 to dispatch their respective requests to primary memory 112 in an order that maintains data coherency. For example, if a read request is issued after a write request for the same data, dispatch logic 232 causes MWQ 220 to dispatch the older write request to primary memory 112 before the read request is dispatched to primary memory 112 so that the read request will retrieve the updated data. Similarly, if a write request is issued after a read request for the same data, dispatch logic 232 causes MRQ 210 to dispatch the older read request to primary memory 112 before the write request is dispatched to primary memory 112 so that the read request will retrieve the data before it is updated by the write request.

Figure 4:
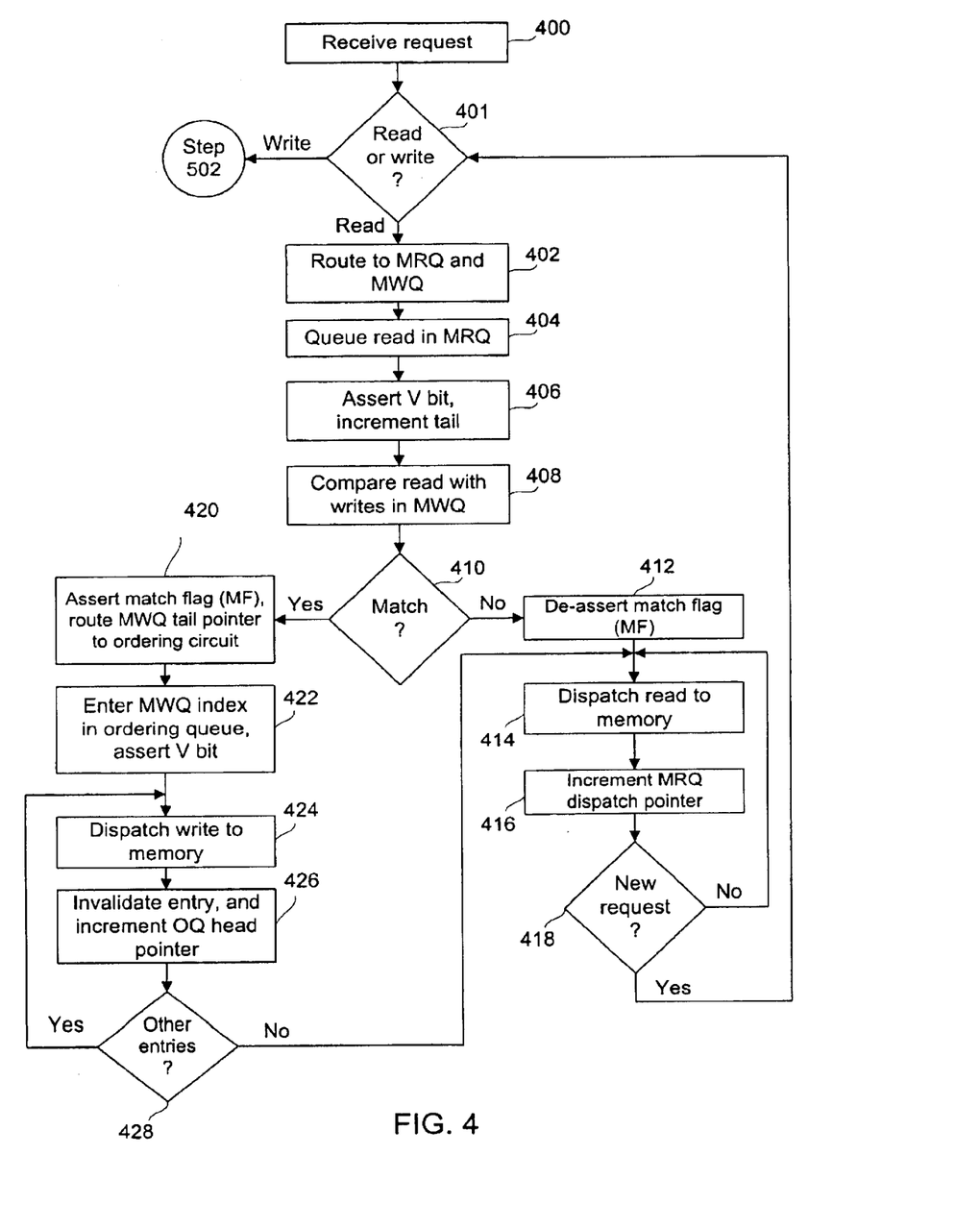
FIGS. 4 and 5 are flow charts illustrating operation of one embodiment of the memory control unit of FIG. 3.

Operation of one embodiment of MCU 300 is described below with respect to the flow charts of FIGS. 4 and 5. Initially, MRQ 210 and MWQ 220 are empty. Accordingly, the head, tail, and dispatch pointers for MRQ 210 are initialized to the first available row in MRQ 210 and, similarly, the head and tail pointers for MWQ 220 are initialized to the first available row in MWQ 220. In one embodiment, the first available row is the row having the lowest logical address, although in other embodiments the first available row may be any other suitable row.

When a request is issued onto CPU bus 203 and received into switching logic 304 (step 400), switching logic 304 examines the control bit associated with the request to determine whether the request is a read request or a write request. If the issued request is a read request, as tested at step 401, the read request is routed to the write input of MRQ 210 and to the compare input of MWQ 220 via bus 301 (step 402). The read request is queued into the row of MRQ 210 indicated by the MRQ tail pointer (step 404). The valid bit 212 is asserted, and the MRQ tail pointer is incremented to the next available row (step 406).

The read request is also used as a search key and compared with all valid write requests stored in MWQ 220 (step 408). If there is not a match in MWQ 220, as tested at step 410, MWQ 220 indicates the mismatch condition to dispatch logic 232 via bus 311 by de-asserting its match flag (step 412). Dispatch logic 232 causes MRQ 210 to dispatch the read request in MRQ 210 identified by the MRQ dispatch pointer to primary memory 112 via MUX 302 in response to address and control signals provided to MRQ 210 via bus 305 and to MUX 302 via line 315 (step 414). The MRQ dispatch pointer is incremented to the next highest priority row in MRQ 210 (step 416). In embodiments in which MRQ 210 includes dispatch bits, the dispatch bit for the read request is asserted to indicate that the request has been dispatched to primary memory 112.

If there is a new request issued on CPU bus 203 and received into MRQ 210, as tested in step 418, processing proceeds to step 401. Otherwise, if a new request has not been received into MRQ 210, dispatch logic 232 allows MRQ 210 to dispatch additional read requests to primary memory 112 using the MRQ dispatch pointer, irrespective of pending write requests stored in MWQ 220. In this manner, read requests are allowed to bypass write requests in order to more quickly return data from primary memory 112 for execution by CPU 202.

If there is a match in MWQ 220, as tested at step 410, there is a PAW condition because the read request addresses data that has been modified during execution of a previous instruction but has not yet been written back to primary memory 112 (as indicated by the matching write request in MWQ 220). Thus, in order to maintain data coherency, the older matching write request must be dispatched to primary memory 112 before the read request. In response to the match condition, MWQ 220 asserts its match flag, and provides the match flag and the MWQ tail pointer to ordering circuit 230 via bus 311 (step 420). The MWQ tail pointer is entered as an index entry into the row of ordering queue 234 indicated by the OQ tail pointer, and the corresponding valid bit 236 is asserted (step 422). Also, the transaction type bit 238 is de-asserted (e.g., to logic 0) to indicate that the ordering queue entry corresponds to a write request stored in MWQ 220.

In response to the ordering queue entry, dispatch logic 232 causes MWQ 220 to dispatch the matching write request to primary memory 112 via MUX 302 in response to address and control signals provided to MWQ 220 via bus 311 and to MUX 302 via line 315 (step 424). Specifically, when the ordering queue valid bit is asserted, dispatch logic 232 causes MWQ 220 to begin dispatching its write requests in a first-in, first-out (FIFO) manner until the MWQ head pointer equals the MWQ tail pointer stored in ordering queue 234. Thus, as the MWQ head pointer increments with each write request dispatched to primary memory 112, dispatch logic 232 compares the MWQ head pointer to the MWQ tail pointer stored in ordering queue 234. When the MWQ head pointer becomes equal to the MWQ tail pointer stored in ordering queue 234, dispatch logic 232 stops MWQ 220 from dispatching additional write requests to primary memory 112, invalidates the ordering queue entry by, for example, de-asserting its valid bit 236, and increments the OQ head pointer to the next highest-priority row (step 426).

If there are no other valid entries in ordering queue 234, as tested in step 428, dispatch logic 232 again allows MRQ 210 to begin dispatching its read requests to primary memory 112 in an out-of-order manner with respect to write requests (step 414). Conversely, if there are other valid entries in ordering queue 234, dispatch logic 232 processes them as described above to ensure data coherency. Because ordering queue 234 may store multiple MWQ index or tail pointer entries, a pending read request queued in MRQ 210 may match multiple write requests stored in MWQ 220. Further, the multiple rows of ordering queue 234 allow dispatch logic 232 to simultaneously manage multiple data coherency issues (e.g., RAW and WAR conditions).

If at any time there are no more pending read requests in MRQ 210, MRQ 210 alerts this condition via bus 305 to dispatch logic 232, which in response thereto causes MWQ 220 to begin dispatching its write requests to primary memory 112 via MUX 302. In one embodiment, dispatch logic allows MWQ 220 to dispatch pending write requests stored therein to primary memory 112 until another read request is issued onto CPU bus 203 and received into switching logic 304.

Figure 5:
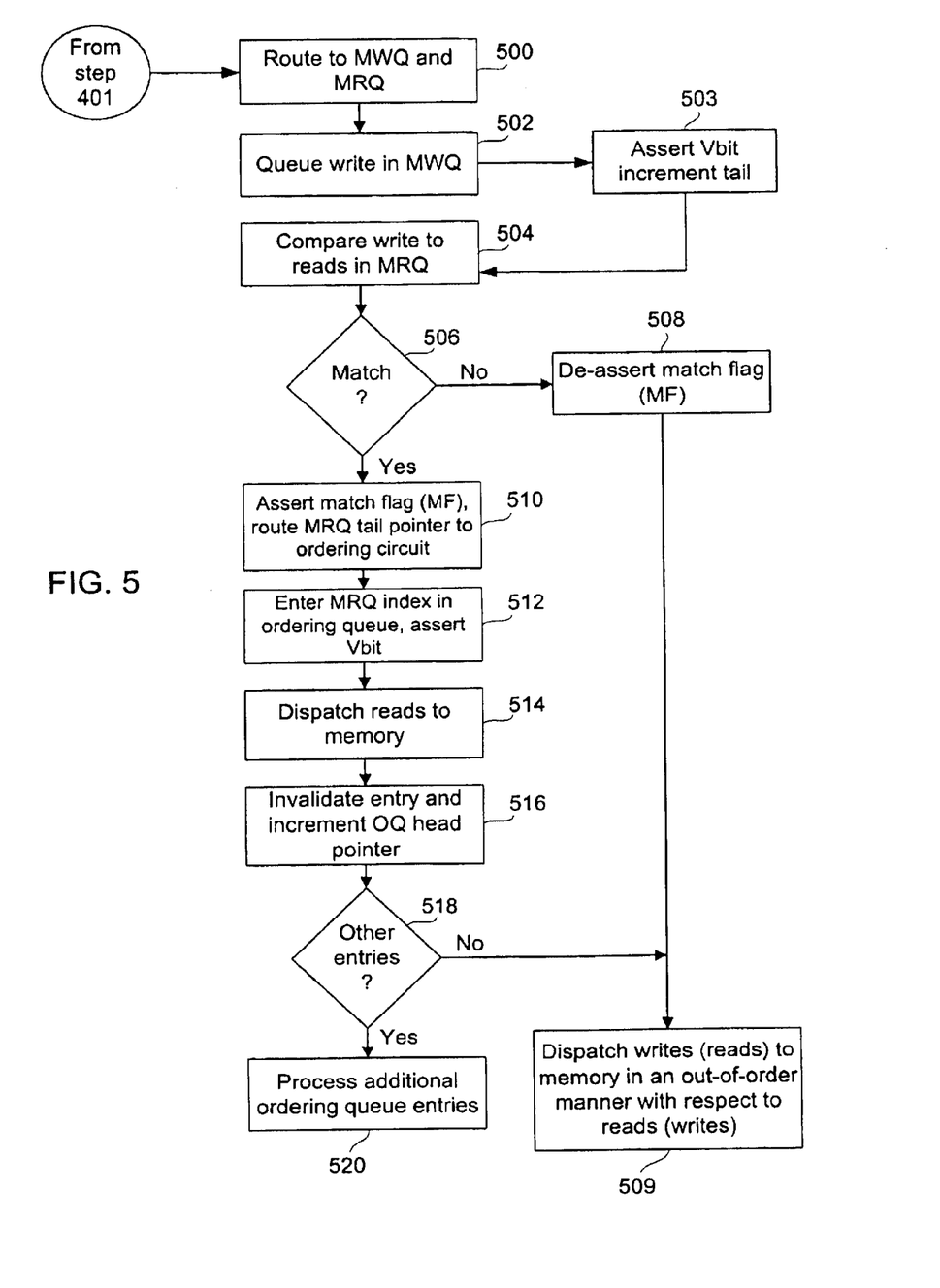

If the request received in switching logic 304 is a write request, as tested at step 401, the request is routed to the write input of MWQ 220 and to the compare input of MRQ 210 via bus 303 (step 500 of FIG. 5). The write request is queued into the row of MWQ 220 indicated by the MWQ tail pointer (step 502). The corresponding MWQ valid bit 222 is asserted, and the MWQ tail pointer is incremented to the next available row of MWQ 220 (step 503). The write request is also used as a search key and compared with pending read requests stored in MRQ 210 (step 504). If there is not a match, as tested in step 506, MRQ 210 indicates the mismatch condition to dispatch logic 232 by de-asserting its match flag (step 508). In response thereto, dispatch logic 232 may allow MWQ 220 to dispatch its write requests ahead of older read requests (step 509).

As mentioned above, it may be desirable to dispatch write requests to primary memory 112 before MWQ 220 becomes full in order to avoid pipeline execution stalls. In one embodiment, MWQ 220 includes a marker that alerts dispatch logic 232 when a predetermined number of write requests are queued in MWQ 220 and awaiting dispatch to primary memory 112. In one embodiment, MWQ 220 asserts the marker when 4 or more pending write requests are stored in MWQ 220, although other indications may be used. In response to the asserted marker, dispatch logic 232 may cause MWQ 220 to begin dispatching its write requests to primary memory ahead of any older read requests so that MWQ 220 does not become full.

Conversely, if there is a match in MRQ 210, as tested in step 506, then the write request matches an older read request, and there is a WAR condition. Thus, in order to maintain data coherency, the older matching read request is dispatched to primary memory 112 before the write request. In response to the match condition, MRQ 210 asserts a match flag, and provides the match flag and the MRQ tail pointer to dispatch logic 232 via bus 305 (step 510). The MRQ tail pointer is entered as an index entry into the row of ordering queue 234 indicated by the OQ tail pointer (step 512). The corresponding ordering queue valid bit 236 is asserted, and the transaction type bit 238 is asserted (e.g., to logic 1) to indicate that the ordering queue entry corresponds to a read request stored in MRQ 210.

In response to the MRQ index entry (i.e., MRQ tail pointer) stored in ordering queue 234, dispatch logic 232 causes MRQ 210 to dispatch the matching read request to primary memory 112 via MUX 302 (step 514). Specifically, when the ordering queue valid bit is asserted, dispatch logic 232 causes MRQ 210 to begin dispatching its read requests in a FIFO manner until the MRQ dispatch pointer equals the MRQ index entry stored in ordering queue 234. Thus, as the MRQ dispatch pointer increments with each read request dispatched to primary memory 112, dispatch logic 232 compares the MRQ dispatch pointer to the MRQ tail pointer stored in ordering queue 234. When the MRQ dispatch pointer becomes equal to the MRQ tail entry stored in ordering queue 234, dispatch logic 232 invalidates the ordering queue entry, for instance, by de-asserting its corresponding valid bit 236, and increments the OQ head pointer (step 516).

If there are additional entries in ordering queue 234, as tested at step 518, they are processed as described above (step 520). Otherwise, dispatch logic 232 allows read requests to be dispatched to primary memory 112 in an out-of-order manner with respect to write requests (step 509). By comparing incoming write requests to be queued in MWQ 220 with read requests already queued in MRQ 210, present embodiments ensure that read requests issued on CPU bus 203 are dispatched to primary memory 112 before any subsequently issued write requests for the same data are dispatched to primary memory 112, thereby maintaining data coherency.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention. For example, in some embodiments, the valid bits 212 and 222 of MRQ 210 and MWQ 220, respectively, may be stored in ordering circuit 230.

What is claimed is:

1. A method for dispatching read and write requests to a memory, comprising:

queuing at least one write request in a write queue;

queuing an incoming read request in a read queue;

comparing the read request with the at least one write request in the write queue to detect a matching write request;

if there is a matching write request, storing a write queue index of the matching write request as a first entry in an ordering queue; and dispatching the at least one write request to the memory in response to the first ordering queue entry.

2. The method of claim 1, wherein the write queue index comprises a tail pointer of the write queue.

3. The method of claim 1, wherein the matching of a write request indicates a read after write condition.

4. The method of claim 1, wherein the dispatching comprises:

dispatching the at least one write request from the write queue to the memory until a head pointer of the write queue equals the write queue index stored in the ordering queue.

5. The method of claim 4, wherein the dispatching of the at least one write request comprises:

(a) dispatching the write request stored at the write queue head pointer in the write queue to the memory;

(b) comparing the write queue head pointer to the write queue index stored in the ordering queue; and (c) if there is a match in step (b), invalidating the first ordering queue entry; and (d) if there is not a match in step (b), incrementing the write queue head pointer; and (e) repeating steps (a)–(d).

6. The method of claim 4, further comprising:

invalidating the first ordering queue entry.

7. The method of claim 4, further comprising:

de-asserting a transaction type bit to indicate that the first ordering queue entry corresponds to a write request.

8. The method of claim 4, further comprising:

dispatching the read request to the memory before dispatching the at least one write request to the memory, even if the at least one write request is older than the read request if there is not a matching write request.

9. The method of claim 1, further comprising:

comparing each write request with read requests in the read queue to detect a matching read request;

if there is a matching read request, storing a read queue index of the matching read request as a second entry in the ordering queue; and dispatching the read requests to the memory in response to the second ordering queue entry.

10. The method of claim 9, wherein the read queue index comprises a tail pointer of the read queue.

11. The method of claim 9, wherein dispatching the read requests comprises:

dispatching the read requests from the read queue to the memory until a dispatch pointer of the read queue equals the read queue index stored in the ordering queue.

12. The method of claim 11, wherein dispatching the read requests from the read queue comprises:

(a) dispatching the read request stored at the dispatch pointer in the read queue to the memory;

(b) comparing the read queue dispatch pointer to the read queue index stored in the ordering queue; and (c) if there is a match in step (b), invalidating the second entry in the ordering queue; and (d) if there is not a match in step (b), incrementing the read queue dispatch pointer; and (e) repeating steps (a)–(d).

13. The method of claim 11, further comprising:

invalidating the second ordering queue entry.

14. The method of claim 11, further comprising:

asserting a transaction type bit to indicate that the second ordering queue entry corresponds to a read request.

15. The method of claim 9, further comprising:

dispatching the at least one write request to the memory before dispatching the read request to the memory, even if the read request is older than the at least one write request if there is not a machine read request.

16. A method for dispatching read and write requests to a memory, comprising:

queuing the write requests in a write queue; queuing the read requests in a read queue;

comparing each read request with the write requests in the write queue to detect a matching older write request;

if there is a matching older write request, storing a tail pointer of the write queue as a first entry in an ordering queue;

comparing each write request with the read requests in the read queue to detect a matching older read request;

if there is a matching older read request, storing a tail pointer of the read queue as a second entry in the ordering queue; and dispatching the read and write requests to the memory in an order determined by the first and/or second ordering queue entries.

17. The method of claim 16, wherein the dispatching comprises:

dispatching the write requests from the write queue to the memory until a head pointer of the write queue equals the write queue tail pointer stored in the ordering queue.

18. The method of claim 17, wherein the dispatching further comprises:

dispatching the read requests from the read queue to the memory until a dispatch pointer of the read queue equals the read queue tail pointer stored in the ordering queue.

19. The method of claim 16, further comprising:

dispatching the read requests to the memory before dispatching the write requests to the memory, even if the write requests are older than the read requests if there is not a matching older write request.

20. The method of claim 16, further comprising:

dispatching the write requests to the memory before dispatching the read requests to the memory, even if the read requests are older than the write requests if there is not a matching older read request.

21. A memory controller for dispatching read and write requests to a memory, comprising:

a read queue having a plurality of rows, each for storing a read request;

a write queue having a plurality of rows, each for storing a write request;

an ordering queue having a plurality of rows, each for storing either a write queue index of an older write request that addresses the same data as a newer read request or a read queue index of an older read request that addresses the same data as a newer write request; and dispatch logic coupled to the ordering queue and to the read and write queues, the dispatch logic controlling the dispatch of the read and write requests from the respective read and write queues to the memory in response to the read and/or write queue indices stored in the ordering queue.

22. The memory controller of claim 21, wherein:

the write queue comprises a content addressable memory (CAM) having a write input coupled to receive write requests, a compare input coupled to receive read requests, a control terminal coupled to the dispatch logic, and an output selectively coupled to the memory; and the read queue comprises a CAM having a write input coupled to receive the read requests, a compare input coupled to receive the write requests, a control input coupled to the dispatch logic, and an output selectively coupled to the memory.

23. The memory controller of claim 22, further comprising:

a multiplexer having a first input coupled to the output of the read queue, a second input coupled to the output of the write queue, an output coupled to an input of the memory, and a control input coupled to the dispatch logic.

24. The memory controller of claim 22, wherein the ordering queue further comprises a plurality of valid bits, each indicating whether a valid entry is stored in a corresponding row of the ordering queue.

25. The memory controller of claim 24, wherein the ordering queue further comprises a plurality of transaction type bits, each indicating whether a corresponding ordering queue entry corresponds to a write request or a read request.

* * * * *